United States Patent [19]

Miyata et al.

[11] 4,180,309
[45] Dec. 25, 1979

[54] FOCAL POINT DETECTING DEVICE FOR SLR CAMERA

[75] Inventors: Katsuhiko Miyata, Omiya; Seijiro Tokutomi, Tokyo; Kazuo Nakamura, Asaki, all of Japan

[73] Assignee: Asahi Kogaku Kogyo Kabushiki Kaisha, Tokyo, Japan

[21] Appl. No.: 798,718

[22] Filed: May 19, 1977

[30] Foreign Application Priority Data

May 22, 1976 [JP] Japan .................. 51-59480

[51] Int. Cl.² ............................................. G03B 13/18
[52] U.S. Cl. ....................... 354/25; 354/31; 354/60 L; 354/198; 354/289
[58] Field of Search .............. 354/25, 31, 60 L, 289, 354/198; 352/140; 356/4, 122–126; 250/201, 204

[56] References Cited

U.S. PATENT DOCUMENTS

| | | |
|---|---|---|
| 3,936,849 | 2/1975 | Tsujimoto .................. 354/25 X |
| 3,938,894 | 2/1976 | Nanba ........................ 354/25 X |
| 3,945,023 | 3/1976 | Stauffer ........................ 354/25 |
| 4,005,443 | 1/1977 | Albrecht .......................... 354/25 |
| 4,047,022 | 9/1977 | Holle ............................. 354/25 X |
| 4,047,187 | 9/1977 | Mashimo et al. .............. 354/25 X |

*Primary Examiner*—L. T. Hix
*Assistant Examiner*—William B. Perkey
*Attorney, Agent, or Firm*—Sughrue, Rothwell, Mion, Zinn and Macpeak

[57] ABSTRACT

A pair of wedge prisms 11, 11' are disposed at an optical position equivalent to that of the film 10 in an SLR camera, and light from the object is directed thereon by a mirror 4 or the like. The prisms split the object image into two halves which are projected onto a two row array of thin photocells or the like, whereby the relative lateral displacement between the image halves as well as their level of contrast is a function of the degree of correct image focus. The latter is sensed by subtractively of differentially comparing the outputs of paired, laterally offset photocells in the two rows, such pairing being implemented in both directions. The output summation signal exhibits an easily detectable sharp peak when the object is properly focused, thereby enabling automatic focal point detection.

16 Claims, 29 Drawing Figures

FOCAL POINT DETECTING DEVICE FOR SLR CAMERA

BACKGROUND OF THE INVENTION

This invention relates to a focal point detecting device for a single-lens reflex camera wherein the image of an object is divided into two parts or halves by means of two wedge type prisms so that the two half-images are displaced from each other, and their relative displacement is varied according to the focusing conditions of the object.

A number of methods have been proposed in which focal point detection is carried out by utilizing variations in the contrast, spatial frequency and light quantity of an object when it is focused. Most of these conventional methods are not suitable for single-lens reflex cameras, however, because the detecting apparatus is sensitive to mechanical vibrations, too large in size, and too intricate in its construction.

In addition, it is very difficult to accomplish focal detection with a high degree of accuracy.

A method is also known in which the image of an object is divided into two parts or half-images by means of wedge type prisms so that the two half-images are displaced in opposite directions from each other, and focal point detection is effected from variations in the relative displacement of the two half-images. In this conventional method, however, it is necessary that the image of the object be sharp and clear even when the object is not in focus. Accordingly, in order to obtain the necessary image clarity, the device must be unduly large and is therefore not suitable for single-lens reflex cameras.

SUMMARY OF THE INVENTION

Accordingly, an object of this invention is to provide a focal point detecting device which utilizes both the contrast detection method and the image alignment detection method. More specifically, an object of this invention is to provide a focal point detecting device for a single-lens reflex camera which is small in size, high in accuracy, and which can carry out focal point detection for an object whose brightness is relatively low.

DETAILED DESCRIPTION OF THE PREFERRED EMBODIMENTS

Figure 1:
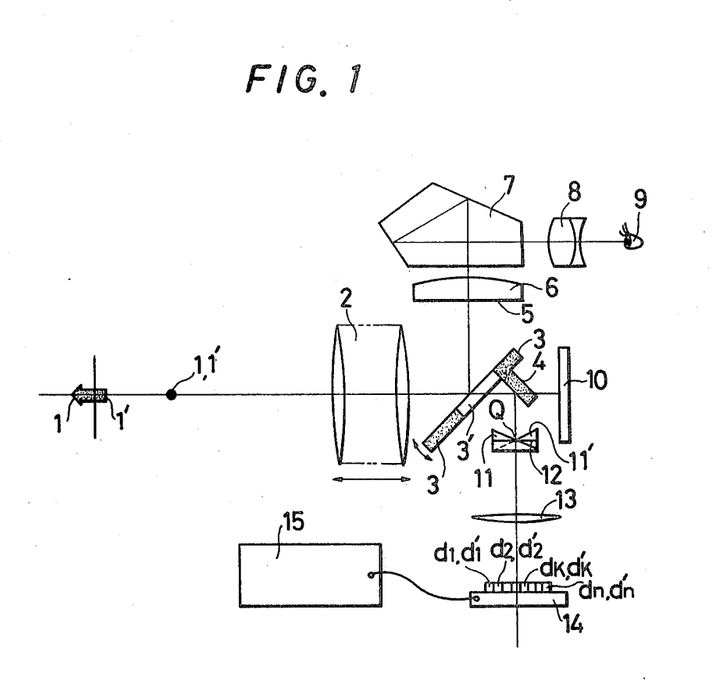
FIG. 1 shows a schematic diagram of an optical system in a single lens reflex camera according to a first embodiment of the present invention.

FIG. 1 shows the arrangement of the optical system of a single lens reflex camera provided with a focal point detecting device according to the invention, wherein reference numerals 1 and 1' designate an object, 2 designates a camera lens group, 3 is a total reflecting mirror having a half mirror section 3' at its central portion, 4 is a total reflecting mirror, 5 is a focal point plate, and 6 is a condenser lens. Reference numeral 7 designates a penta-prism, 8 an eye piece, 9 a photographer's eye, 10 a film, 11 and 11' are two wedge type prisms disposed at optically equivalent positions with respect to the film 10 and having oppositely inclined slopes, 12 is an interface or border line where the two prisms 11 and 11' contact each other, 13 is a lens for projecting the image of the object 1, 1' onto a conversion element group 14 comprising pairs of minute photocells $d_1-d_n$ and $d_1'-d_n'$, and 15 is a focal point detection circuit (illustrated in detail in FIG. 6) for processing the outputs of the photocells.

Figure 2:
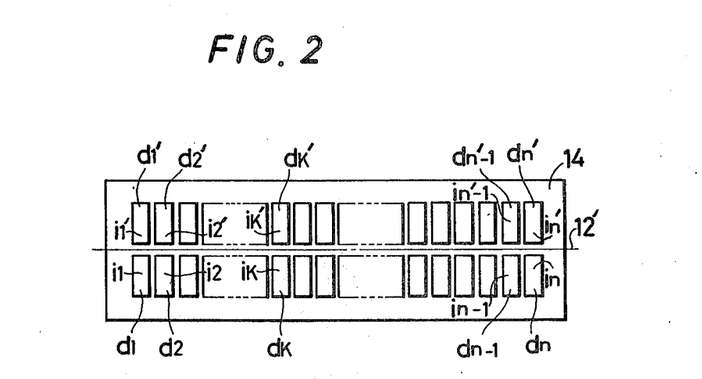
FIG. 2 shows the arrangement of an array of photocells, FIGS. 3 (a) through 3 (e) show the object image halves projected onto the photocell array in various states of focus.
Figure 2:
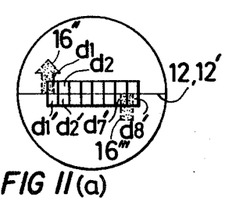

FIG. 2 shows the conversion element group 14 in detail. The light receiving surfaces of the photocells $d_1-d_n$ and $d_1'-d_n'$, which have equal electrical characteristics and light receiving areas, are symmetrically disposed with respect to a center line 12'. Reference characters $i_1-i_n$ and $i_1'-i_n'$ designate the outputs of the photocells $d_1-d_n$ and $d_1'-d_n'$, respectively, which are proportional to the light quantity or intensity of the incident pencils of light rays.

FIGS. 3 (a) through 3 (e) show various states of the images 16 and 16' of the object which are projected onto the conversion element group 14 through the lens 2, the two wedge prisms 11 and 11', and the projecting lens 13. In FIGS. 3 (a), (b), (d) and (e) the object image is not correctly focused. The relative deviation in FIG. 3 (a) is greater than that in FIG. 3 (b), and the relative deviation in FIG. 3 (e) is greater than that in FIG. 3 (d). The deformation and relative displacement of the image halves thus indicates the degree of "unfocus". In FIG. 3 (c) the image is correctly focused.

As is apparent from FIGS. 3 (a) through 3 (e), the object is optically divided into two parts, i.e., the upper object 1 and the lower object 1', while the image of the object is also divided into an upper image 16 and a lower image 16' corresponding to the upper and lower objects, respectively. The center line 12' optically corresponds to the border line 12 between the two wedge prisms 11 and 11'.

Figure 4:
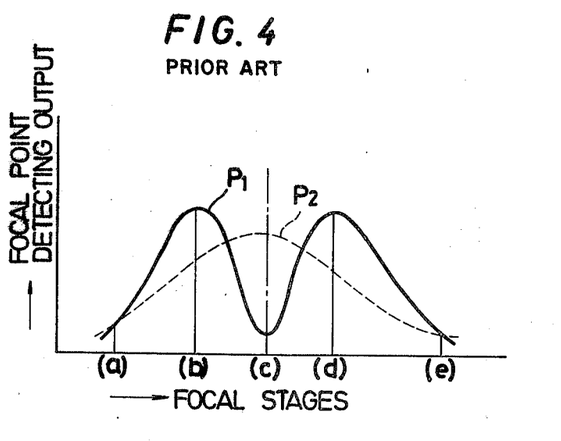
FIG. 4 shows a graphical representation of the focal point detection outputs in a conventional device.
Figure 5:
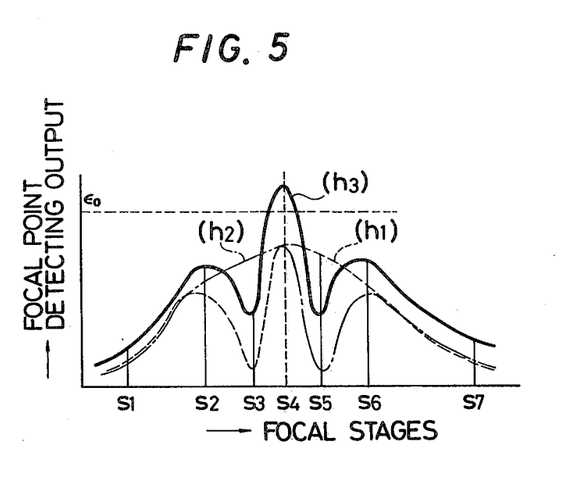
FIG. 5 shows such a graphical representation according to the invention.

FIG. 4 shows a graphical representation of the focal point detecting outputs in a conventional method, and FIG. 5 shows a similar representation according to this invention.

Figure 6:
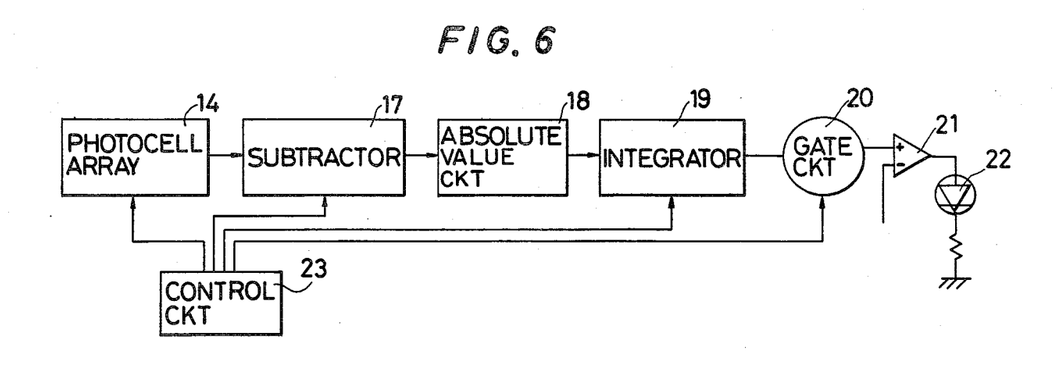
FIG. 6 shows a block diagram of an electrical focal point detecting circuit.

FIG. 6 shows a block diagram of the focal point detection circuit 15 shown in FIG. 1, which comprises a subtractor 17, an absolute value circuit 18, an integrator 19, a gate 20 and a comparator 21. When the correct focus is obtained a display unit 22, such as a light emitting diode (LED), is energized. The whole circuit is controlled by a control unit 23.

The operation of this first embodiment will now be described with reference to FIGS. 1 through 6.

In FIG. 1, the light of the object 1, 1' is passed through the lens 2 and then reflected by the mirror 3, whereby the image of the object is formed on the focal point plate 5. The light from this image passes through the condenser lens 6, the penta-prism 7, and the eye piece 8 to the photographer's eye 9. At the same time, the light from the object is passed through the half mirror 3' and reflected by the mirror 4 to form an image of the object in the vicinity of the two wedge prisms 11 and 11', whose positions are optically equivalent to that of the film 10. This image is divided into upper and lower halves by the prisms, as described above, and the two halves are displaced in opposite directions and projected onto the conversion element group 14 through the lens 13.

When the image is focused at a position Q which is optically equivalent to the position of the film 10, the relative displacement owing to the prisms 11 and 11' is zero and no image half displacement is produced on the conversion element group 14.

The states of the images 16 and 16' on the conversion element group 14 will be described with reference to FIG. 3, wherein n is the number of photocells in each row of the group.

Figures 3A, 3B:
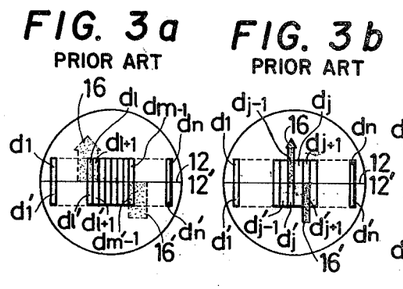

It is assumed that the lens 2 is moved in only one direction from a non-focused position (either long or short) through a focused position and on to a non-focused position at the other extreme. When the lens 2 is initially out of focus the images 16 and 16' in FIG. 3 (a) are displaced relatively far apart from each other along the center line 12' by the two prisms, and the clarity and contrast of the image halves is quite low. The image halves are projected onto photocells $d_l$, $d_{l+1}$, $d_{m-1}'$ and $d_m'$.

As the lens 2 is moved the image clarity and contrast is increased, and the relative displacement of the two halves is reduced. This state is shown in FIG. 3 (b), wherein the images are projected onto photocells $d_{j-1}$ and $d_{j+1}'$.

If the lens 2 is moved further it eventually becomes focused on the object as shown in FIG. 3 (c), wherein the image contrast is at its maximum and the relative displacement is zero. The images here are projected onto photocells $d_j$ and $d_j'$.

As the lens is moved still further it goes out of focus as shown in FIGS. 3 (d) and (e), wherein the direction of relative image displacement is opposite to that in FIGS. 3 (a) and (b).

A method for electrically detecting the focal condition of the two image halves will now be described.

If the widths of the photocells in the group 14 are relatively small and the relative displacement of the image halves 16 and 16' is zero, it can be considered that equal pencils of light rays are applied to a single pair of oppositely disposed photocells. Accordingly, when the lens is focused on the object, the difference between the outputs of the pair of photocells is zero.

Figure 3C:
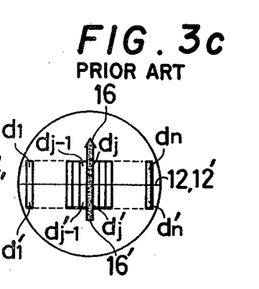
Figure 3D:
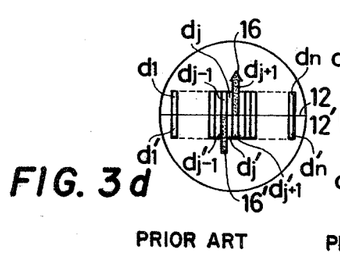
Figure 3E:
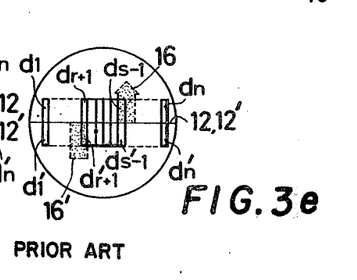

If, in FIGS. 3 (a) through (e), the sum of the output differences of the array of photocell pairs as represented by $\epsilon(a)-\epsilon(e)$ can be expressed as follows:

$$\epsilon(a) = \sum_{q=1}^{n} |i_q - i_{q'}| = \ldots + |i_l - i_l'| + |i_{l+1} - i_{l+1}'| + |i_{m-1} - i_{m'-1}'| + |i_m - i_{m'}'| \ldots$$

$$\epsilon(b) = \sum_{q=1}^{n} |i_q - i_{q'}| = |i_{j-1} - i_{j-1}'| + |i_{j+1} - i_{j+1}'|$$

$$\epsilon(c) = \sum_{q=1}^{n} |i_q - i_{q'}| = 0$$

$$\epsilon(d) = \sum_{q=1}^{n} |i_q - i_{q'}| = |i_{j-1} - i_{j-1}'| + |i_{j+1} - i_{j+1}'|$$

$$\epsilon(e) = \sum_{q=1}^{n} |i_q - i_{q'}| = \ldots + |i_{r-1} - i_{r-1}'| + |i_r - i_r'| + |i_{s-1} - i_{s-1}'| + |i_s - i_s'| \ldots$$

The output difference of the photocells not mentioned above (those on which no light is incident) is zero, and therefore $\epsilon(a)\cdot\epsilon(b)\cdot\epsilon(d)\cdot\epsilon(e) > \epsilon(c) = 0$. In other words, the output $$\epsilon = \sum_{q=1}^{n} |i_q - i_{q'}|$$

becomes zero or reaches a minimum value when the object is in focus, and focal point detection can thus be performed by detecting this output.

In actual practice the subtractive array output in the focused condition cannot be zero because of fluctuations in the photocell characteristics, and it will have a value $\epsilon_o$ ($\epsilon_o > 0$). Furthermore, in the case of FIGS. 3 (a) and (e) where the image is unclear and the contrast is low, the following relation is established:

$$i_l \approx i_l', \ i_m \approx i_m', \ i_r \approx i_r' \ldots i_s \approx i_s'$$

Accordingly, the magnitude relation between $\epsilon(c)$ and $\epsilon(a)\cdot\epsilon(e)$ becomes unclear, and focal point detection is very difficult in this case.

The variation of the detection output $\epsilon$ is indicated by curve $P_1$ in FIG. 4, wherein, for the cases of FIGS. 3 (b) and (d), the output is at a maximum value because the contrast is high and the images are spaced apart from each other. The focal point positions (a), (b), (c), (d) and (e) in FIG. 4 correspond to those shown in FIG. 3.

Now, consider the case where focal point detection is carried out by measuring the variation in contrast. In this case, the detection output $\epsilon_1$ can be represented by the following equations:

$$\epsilon_1 = \sum_{q=1}^{n-1} |i_q - i_{q+1}| \text{ or } \epsilon_1 = \sum_{q=1}^{n-1} |i_{q'} - i_{q'-1}|.$$

When the lens is focused on the object, the maximum value is obtained. Curve $P_2$ in FIG. 4 indicates the variations of the detection output $\epsilon_1$, and shows the maximum value to lie at the correct focusing position (c).

Thus, in the former detection method as the lens goes out of focus the images 16 and 16' become unclear and the detection output $\epsilon$ for FIGS. 3 (a), (c) and (e) cannot be distinguished from one another. To overcome this difficulty a more intricate circuit is required. Furthermore, to maintain the clarity of the images 16 and 16' it is necessary to increase the size of the detecting device. These are drawbacks of the former detection method.

In the latter method, although it is unnecessary to maintain the clarity of the images, the detection performance for an object with low brightness or low illumination is considerably decreased. Thus, the latter method is also disadvantageous.

A focal point detecting method according to this invention, which overcomes the above-described difficulties, will now be described.

With respect to images 16 and 16' having suitable clarity, the sum $\epsilon_2$ of the output differences of paired photocells which are spaced apart from each other by P columns in the array is:

$$\epsilon_2 = \sum_{q=1}^{n-p} |i_q - i_{q'+p}| \text{ or } \epsilon_{2'} = \sum_{q=1}^{n-p} |i_{q'} - i_{q+p}|,$$

where $P = 1, 2, 3, \ldots, n-1$, and q is the element number of a photocell. The variations of the detection outputs $\epsilon_2$ and $\epsilon_{2'}$ with respect to focal point position are shown by curves $h_1$ and $h_2$ in FIG. 5.

The variations in the curve $h_1$ will now be described. At the focal point position $S_1$ in FIG. 5 the lens is completely out of focus. In this case the contrast is very low and therefore $i_q \approx i_{q'+p}$, where $1 \leq q \leq n-p$. The detection output $\epsilon_2$ thus approaches zero. At the focal point position $S_2$ the lens is moved closer to a focused position. In this case the contrast becomes higher and an output difference owing to relative displacement is obtained. Accordingly, the detection output $\epsilon_2$ increases to a first peak value.

At position $S_3$ the lens is much closer to the focused position. The contrast is now much higher, but the detection output $\epsilon_2$ approaches zero as the relative displacement of the images similarly approaches zero.

At position $S_4$ the lens is focused on the object. In this case, the contrast is maximum and the actual or true relative displacement of the images becomes zero. Since the output difference of the paired photocells is under the condition $P \geq 1$, however, it can be considered that an equivalent relative displacement of the images occurs. The detection output $\epsilon_2$ therefore reaches a maximum value.

At position $S_5$ the lens has moved past the correct focal position, whereby the contrast decreases and some relative displacement of the images is observed. The detection output $\epsilon_2$ is thus slightly lower than at position $S_4$.

At positions $S_6$ and $S_7$ the lens is further removed from the focal position, whereby the contrast is further decreased and the relative displacement of the images is increased. The detection output $\epsilon_2$ thus continues to decrease.

As can be readily seen from the equations of $\epsilon_2$ and $\epsilon_{2'}$, the curves $h_1$ and $h_2$ are symmetrical with respect to the correct focal position $S_4$. In other words, positions $S_1$ through $S_7$ of curve $h_1$ correspond to positions $S_7$ through $S_1$ of curve $h_2$, respectively.

The composite of detection output $\epsilon_2$ (curve $h_1$) and detection output $\epsilon_{2'}$ (curve $h_2$) is shown by curve $h_3$ in FIG. 5. This composite detection output $\epsilon_3$ is employed as the focal point detecting output in the method of this invention. In other words, with the detection of:

$$\epsilon_3 = \epsilon_2 + \epsilon_{2'} = \sum_{q=1}^{n-p} |i_q - i_{q'+p}| + \sum_{q=1}^{n-p} |i_{q'} - i_{q+p}|,$$

the curve in the vicinity of the correct focal position $S_4$ becomes sharply peaked, and the focal point detection accuracy is accordingly very high. Detection can be achieved for a low brightness object, and the distance between the decayed positions $S_3$ and $S_5$ can be varied as desired by suitably selecting the value of P. In addition, image clarity is only required between positions $S_3$ and $S_5$. The optical distance from the two wedge prisms 11 and 11' to the conversion element group 14 can thus be made very short, whereby the device readily lends itself to miniaturization.

When $P=1$, the difference between the outputs of two photocells situated next adjacent each other in an oblique or diagonal direction is obtained. Therefore, the $n-p$ of $\Sigma$ in the left side of the above focal point detection equation becomes $n-1$, whereby the maximum use of the narrow photocells is obtained. In addition, when $P=1$ the range of necessary image clarity is minimized, whereby a unit value of P is preferable. Where only a part of the photocell array of group is used, for example the gth to mth photocells:

$$\epsilon_3 = \epsilon_2 + \epsilon_{2'} = \sum_{q=g}^{m} |i_q - i'_{q+p}| + \sum_{q=g}^{m} |i_{q+p} - i'_q|,$$

where $m-g \geq p$. In this case the same effect can be obtained; however, the detection accuracy is affected by the size of the light receiving surfaces and the number of cells used.

The detection circuit 15 in FIG. 1 will now be described with reference to the block diagram shown in FIG. 6. The circuit 15 processes the outputs $i_1$-$i_n$ and $i_1'$-$i_n'$ of the photocells in the group 14, which are proportional to the incident pencils of light rays. The differences between the various photocell outputs are obtained by the subtraction circuit 17, and the focal point detection output is obtained with the aid of the absolute value circuit 18 and the integration circuit 19. The instant when correct focussing is obtained is displayed by the LED 22 through the comparator 21.

The circuit 23 controls the switching of the photocells to provide the output differences $$\epsilon_2 = \sum_{q=1}^{n-p} |i_q - i_{q'+p}| \text{ and } \epsilon_{2'} = \sum_{q=1}^{n-p} |i_{q'} - i_{q+p}|,$$

at the absolute value circuit output, controls the integration circuit 19 to accumulate the absolute values and controls the gate circuit 20 to pass the focal point detection output $\epsilon_3$ to the comparator 21. The integration circuit is then reset and computation of a new focal point detection output $\epsilon_3$ is begun.

The subtractive input $\epsilon_0$ of the comparator 21 has a value as shown in FIG. 5. By suitably selecting this value, the range of display with respect to correct focusing can be controlled. If the movement of the lens 2 is carried out manually, and such movement is detected by a display unit, such as an LED, it can be utilized as a focal point detecting device. If the lens 2 is driven by an electric motor, the output of the comparator 21 can be utilized as a stop signal for the drive circuit of the motor, whereby automatic focal point detection can be achieved for single-lens reflex and other cameras because the device can be made very small and accurate.

Figure 7:
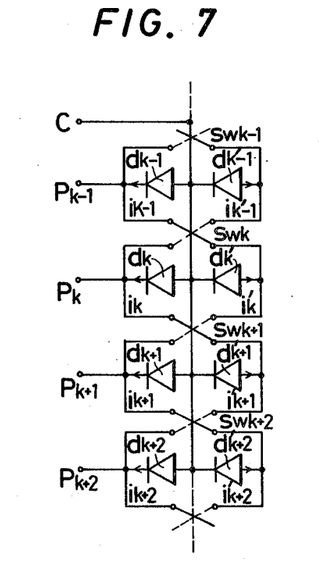
FIG. 7 shows a connection diagram for an array of paired photo diodes, FIGS. 8 (a) through 8 (f) show a timing diagram for an image sensor embodiment.

FIGS. 7 and 8 relate to embodiments where photo diode groups are used for the paired photocells in the conversion element group 14, and where image sensors such as charge coupled devices (CCD) or bucket brigade devices (BBD) are used which convert images into electrical signals and convert the electrical signals into a pulse train corresponding to the images.

As shown in FIG. 7, the anodes of the paired photo diodes on one side of the array and the cathodes of the photo diodes on the other side are connected to a common terminal C, while the cathodes of the photo diodes on the one side and the anodes of the photo diodes on the other side are connected through a group of switches SW so that the photo diodes specified by the detection equation $$\epsilon_3 = \epsilon_2 + \epsilon_{2'} = \sum_{q=1}^{n-p} |i_q - i_{q'+1}| + \sum_{q=1}^{n-p} |i_{q'} - i_{q+1}|$$

are coupled. Where the switch group SW is connected between the common terminal C and the terminals $P_{k-1}, P_k, P_{k+1} \ldots$ of the photo diodes, as indicated by the solid lines, outputs $(i_{k-1}-i_{k'})$, $(i_k-i_{k'+1}) \ldots$ corresponding to the differences between the incident light quantities are obtained at terminals $P_{k-1}, P_k, \ldots$, respectively. On the other hand, where the switch group is connected as shown by the broken lines, outputs $(i_k-i_{k'-1})$, $(i_{k+1}-i_{k'}) \ldots$ are obtained at terminals $P_k$, $P_{k+1}, \ldots$, respectively.

In FIG. 7 the p in (n−p) of $\epsilon$ is 1; however, it may be any integer if p<n. The specific features of this method reside in the detection range being wider and the light receiving surface being larger, whereby focal point detection can be carried out at low illumination with high accuracy.

The light receiving surfaces of the photo diodes are arranged as shown in FIG. 2, and the switch group SW is controlled by the circuit 23 shown in FIG. 6 to supply difference outputs to the subtraction circuit 17.

The control circuit 23 energizes the array 14 of photocells, commands the subtraction circuit 17 to connect the photocell outputs in the manner shown in FIG. 7 so that outputs corresponding to the differences between the incident light quantities are provided to the absolute value circuit 18, commands the integrator 19 to receive and accumulate the latest value from the absolute value circuit 18 and, finally, commands the gate circuit 20 to pass the presently accumulated value in the integrator to the comparator 21. At this time the integrator 19 is reset and computation of a new focal point detection value is commenced. The reseting of the integrator 19 may be accomplished in a variety of ways and the particular technique used for resetting the integrator is not important to the present invention.

FIGS. 8 (a) through 8 (e) realte to the use of a pair of image sensors, wherein 8 (a) shows the clock pulse train for driving them and 8 (b) shows a start pulse for one image sensor, which provides a timed scan. The video signal is shown in 8 (c), 8 (d) shows the start pulse for the other image sensor in the pair, and its video signal is shown in 8 (e). FIG. 8 (f) shows the output waveform representing video signal (e) minus video signal (c).

The FIG. 8 waveforms relate to the detection output $$\epsilon_{2'} = \sum_{q=1}^{n-1} |i_{q'} - i_{q+1}|,$$

where $P=1$ and $V_{1-Vn}$ and $V_1'-V_n'$ correspond to the current outputs $i_1-i_n$ and $i_1'-i_n'$.

Figure 8A:
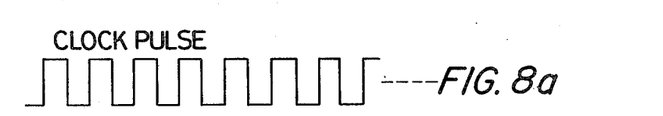
Figure 8B:
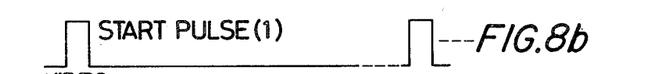
Figures 8C, 8D:
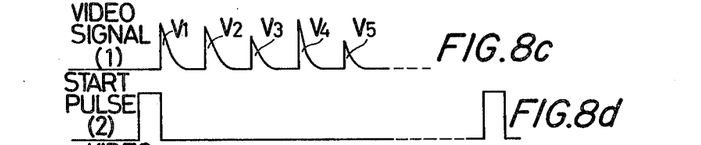
Figure 8E:
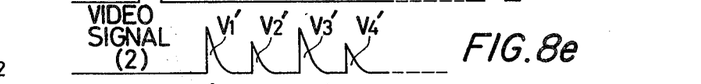
Figure 8F:
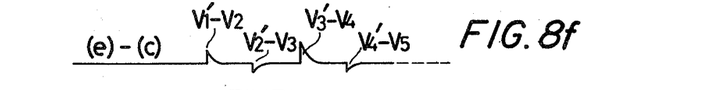
Figure 9:
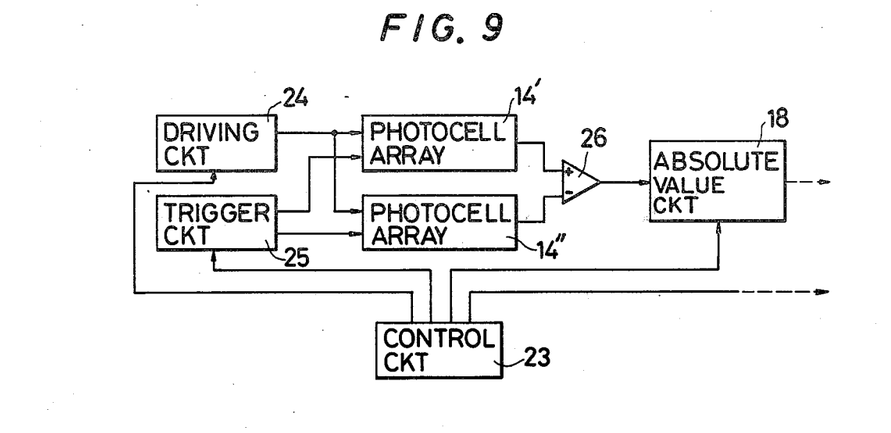
FIG. 9 shows a block diagram of a processing circuit for the outputs of the image sensors in FIG. 8 (a)–(f)

A circuit for processing the outputs of the abovedescribed image sensors is shown in FIG. 9. Clock pulses for driving the sensors 14' and 14" are generated by a driving circuit 24, and a trigger circuit 25 applies scan start pulses to the respective sensors at suitable intervals to obtain timed output waveforms $V_1-V_n$ and $V_1'-V_n'$. These outputs are applied to a differential amplifier 26 to obtain an output difference waveform $V_1'-V_2$, $V_2'-V_3 \ldots V_{n'-1}-V_n$, as shown in FIG. 8 (f).

To obtain the detection output $$\epsilon_2 = \sum_{q=1}^{n-1} |i_q - i_{q'+1}|$$

suitably (reverse) timed scan start pulses are applied by the trigger circuit 25 to obtain output difference waveforms $V_1-V_2'$, $V_2-V_3' \ldots V_{n-1}-V_n'$. Thus, similar to the case of FIG. 6, the focal point detection output $$\epsilon_3 = \epsilon_{2'} + \epsilon_2 = \sum_{q=1}^{n-1} |V_{q'} - V_{q+1}| + \sum_{q=1}^{n-1} |V_q - V_{q'+1}|$$

is applied to the absolute value circuit 18, the integrator 19, etc. to obtain the final circuit output as indicated by the LED 22.

Once again, the arrangement of the light receiving surfaces is as shown in FIG. 2, and the driving circuit 24 and trigger circuit 25 are controlled by the control circuit 23.

The attractive feature of this method resides in that the scan start pulses for the value of P and the detection outputs $\epsilon_2$ and $\epsilon_2'$ can be readily produced, and the circuit is relatively simple because the switch group SW in FIG. 7 is unnecessary and the output differences of predetermined image sensor pairs are produced in a timed series mode.

Image sensors are somewhat disadvantageous, however, in that their S/N ratio is relatively low, whereby outputs for incident pencils of light rays over a wide range cannot be obtained using the same driving frequency. It is therefore preferable that the oscillation frequency of the driving circuit 24 in FIG. 9 be varied in accordance with the intensity of illumination of an object, which may be implemented by using the output of an exposure meter built into the camera as a frequency varying control signal.

Further, if outputs corresponding to incident pencils of light rays are logarithmically compressed by the photoelectric conversion element group 14, focal point detection can be achieved over a wide range of object brightness.

A second embodiment of the invention will now be described with reference to FIGS. 10 through 13.

Figure 10:
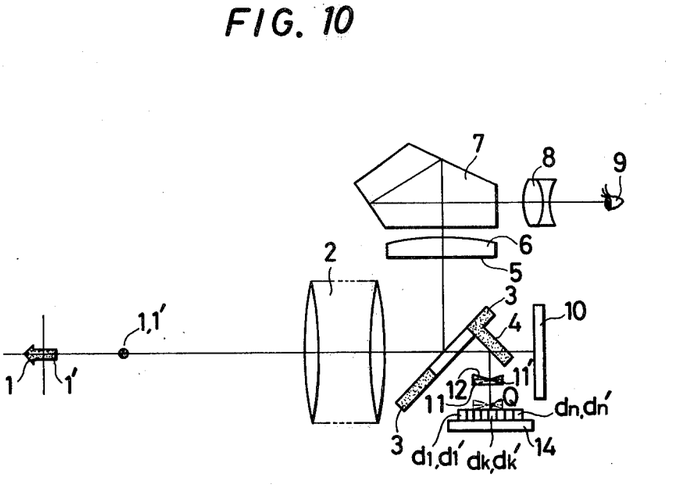
FIG. 10 shows a schematic diagram of an optical system for a single lens reflex camera according to a second embodiment of the invention, FIGS. 11 (a) through 11 (f) show object image halves projected onto the photocell array of the FIG. 10 embodiment in various states of focus.

FIG. 10 shows the arrangement of a single lens reflex camera optical system which is generally equivalent to that shown in FIG. 1, but which differs therefrom in that the conversion element group 14 (rather than the prisms 11, 11') is disposed at a position which is optically equivalent to that of the film 10, and the projection of the object image 1, 1' is accomplished only by the lens 2. The images 16" and 16''' of the object are relatively displaced in opposite directions by the two wedge prisms 11 and 11' disposed between the lens 2 and the group 14.

FIGS. 11 (a) through (f) show various states of the images 16″ and 16‴ projected onto the group 14, in which only eight photoelectric conversion element pairs have been shown for simplicity. FIGS. 11 (a) through (e) indicate the focal states of the image corresponding to those shown in FIGS. 3 (a) through (e), with FIG. 11 (c) showing the correct focussing state. As is apparent from a comparison with FIG. 3 (c), however, since the images of the object 1, 1′ are not focused on the two wedge prisms 11 and 11′, their relative displacement is not zero and they are incident on the photocells $d_4$ and $d_5'$. Such relative displacement in the correct focal state is determined by the vertical angle of the two wedge prisms and the optical distance between them and the photocell group 14, and the image contrast is, of course, at a maximum. If the photocells are electrically paired so that the relative electrical displacement of the images 16″ and 16‴ is zero at the correct focusing position (c), the output difference $d_1-d_2', \ldots d_4-d_5', \ldots d_7-d_8'$ will be approximately zero.

If it is assumed tht the relative displacement of the images in FIG. 11 (c) is Z (Z=1 in the example shown), then the focal point detection output $\epsilon_3$ described above with reference to the first embodiment becomes $$\epsilon_3 = \epsilon_2 + \epsilon_{2'} = \sum_{q=1}^{n-p-z} |i_q - i_{q'+p+z}| + \sum_{q=1}^{n-p-z} |i_{q'} - I_{q+p-z}|.$$

When the photocell rows are shifted by Z, as shown in FIG. 11 (f), then the same effect can be obtained and the output equation again becomes:

$$\epsilon_3 = \epsilon_2 + \epsilon_{2'} = \sum_{q=1}^{n-p} |i_q - i_{q'+p}| + \sum_{q=1}^{n-p} |i_{q'} - i_{q+p}|.$$

The advantages of this arrangement are that the projecting lens 13 can be eliminated, and accordingly the device can be made much smaller. The size can be further reduced by placing the photocell group 14 in close contact with the two prisms as shown in dotted outline in FIG. 10, and in this case the optical adjustment becomes much simpler.

The photocells in this embodiment can, of course, be replaced by photo diodes or image sensors as described above.

Figure 12:
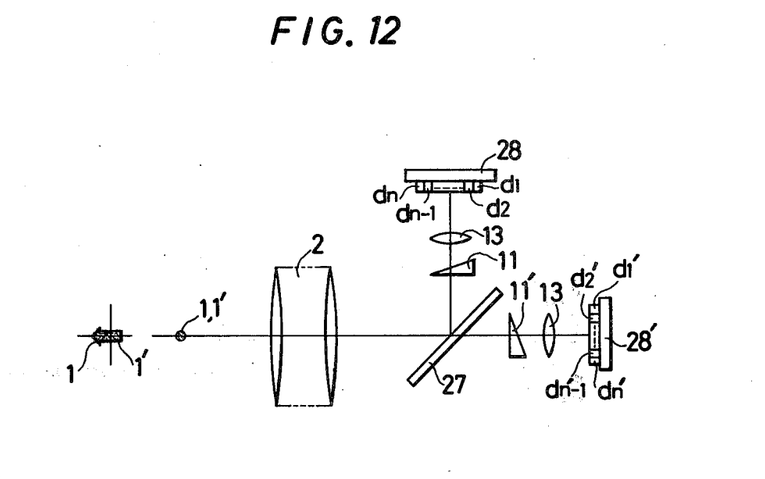
FIG. 12 shows a schematic diagram of an optical system according to a third embodiment of the invention.

The concept of the invention can also be implemented by an arrangement as shown in FIG. 12, wherein the two prisms are separately disposed and the object image is divided into two parts by a half mirror 27.

Figure 13:
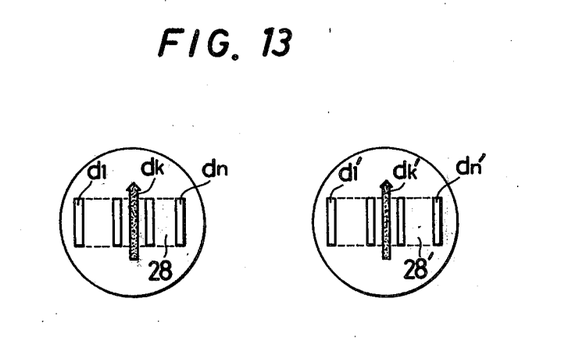
FIG. 13 shows the object image projected onto the photocell arrays in FIG. 12 when the object is in focus.

FIG. 13 shows the object image on one-dimensional photocell groups 28 and 28′ when the lens is correctly focused, wherein it can be seen that the image has a maximum contrast and zero relative displacement between the photocells $d_k$ and $d_k'$.

The specific details of the control circuits 23 in FIGS. 6 and 9 have not been disclosed herein in the interest of simplicity, because such details form no part of the present invention and are not necessary for a full understanding thereof, and because their precise circuit configurations may taken any one of a number of forms well within the skill of the ordinary designer.

What is claimed is:

1. In a single lens reflex camera including a pair of oppositely inclined wedge prisms, a two row array of photoelectric conversion elements disposed optically beyond the prisms, and means for directing light rays from a photographic object onto the prisms, whereby the prisms split the object image into two halves whose relative lateral displacement on the array element rows and level of contrast is a function of the degree of correct image focus, means for detecting the correct image focus characterized by:
    (a) means for differentially comparing the outputs of paired, laterally offset elements in the two array rows, said paired elements being laterally offset by equal amounts in two opposite directions parallel to the array rows,
    (b) means for summing the results of said differential comparisons, and
    (c) means for detecting when said summed results exceed a predetermined threshold level indicative of correct image focus.

2. A single lens reflex camera as defined in claim 1, wherein the prisms are disposed at a position optically equivalent to that of the film surface.

3. A single lens reflex camera as defined in claim 1, wherein the array is disposed at a position optically equivalent to that of the film surface.

4. A single lens reflex camera as defined in claim 1, wherein the photoelectric conversion elements are photo diodes.

5. A single lens reflex camera as defined in claim 2, wherein the photoelectric conversion elements are photo diodes.

6. A single lens reflex camera as defined in claim 3, wherein the photoelectric conversion elements are photo diodes.

7. A single lens reflex camera as defined in claim 1, wherein the photoelectric conversion elements are image sensors and means are provided for performing timed scans of the two image halves.

8. A singles lens reflex camera as defined in claim 2, wherein the photoelectric conversion elements are image sensors and means are provided for performing timed scans of the two image halves.

9. A single lens reflex camera as defined in claim 3, wherein the photoelectric conversion elements are image sensors and means are provided for performing timed scans of the two image halves.

10. A single lens reflex camera as defined in claim 7, wherein the differential comparing means includes means for generating scan start pulses for the respective array rows displaced in time an amount equivalent to the lateral offset of the paired elements.

11. A single lens reflex camera as defined in claim 8, wherein the differential comparing means includes means for generating scan start pulses for the respective array rows displaced in time an amount equivalent to the lateral offset of the paired elements.

12. A single lens reflex camera as defined in claim 9, wherein the differential comparing means includes means for generating scan start pulses for the respective array rows displaced in time an amount equivalent to the lateral offset of the paired elements.

13. A single lens reflex camera as defined in claim 3, wherein the prisms are disposed in contact with the array.

14. A single lens reflex camera as defined in claim 6, wherein the prisms are disposed in contact with the array.

15. A single lens reflex camera as defined in claim 9, wherein the prisms are disposed in contact with the array.

16. A single lens reflex camera as defined in claim 12, wherein the prisms are disposed in contact with the array.

* * * * *